US012280884B2

(12) United States Patent
Miner

(10) Patent No.: US 12,280,884 B2
(45) Date of Patent: Apr. 22, 2025

(54) OUTER BARREL SUPPORT STRUCTURE FOR NACELLE INLET STRUCTURE

(71) Applicant: Rohr, Inc., Chula Vista, CA (US)

(72) Inventor: Jasen A. Miner, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/231,584

(22) Filed: Aug. 8, 2023

(65) Prior Publication Data

US 2025/0051022 A1    Feb. 13, 2025

(51) Int. Cl.
*B64D 29/06* (2006.01)
*B64D 33/02* (2006.01)
*F02C 7/047* (2006.01)

(52) U.S. Cl.
CPC ............. *B64D 29/06* (2013.01); *B64D 33/02* (2013.01); *F02C 7/047* (2013.01); *B64D 2033/0233* (2013.01)

(58) Field of Classification Search
CPC ........ B64D 33/02; B64D 29/00; B64D 29/06; B64D 2033/0233; B64D 15/12; B64D 15/14; B64C 7/02; F02C 7/04; F02C 7/047
See application file for complete search history.

(56) References Cited

U.S. PATENT DOCUMENTS

| 2,581,760 | A  | * | 1/1952  | Miner | B64D 15/02 244/134 R |
| 6,585,191 | B2 | * | 7/2003  | Andre | F02C 7/047 244/134 B |
| 7,469,862 | B2 | * | 12/2008 | Layland | B64D 29/08 244/134 R |
| 7,513,458 | B2 |   | 4/2009  | Layland | |
| 7,923,668 | B2 |   | 4/2011  | Layland | |
| 8,740,137 | B2 |   | 6/2014  | Vauchel | |
| 9,102,413 | B2 |   | 8/2015  | Porte | |
| 9,403,599 | B2 |   | 8/2016  | Binks | |
| 9,567,905 | B2 |   | 2/2017  | Porte | |

(Continued)

FOREIGN PATENT DOCUMENTS

FR    2836182 B1    10/2005

OTHER PUBLICATIONS

EP Search Report for EP Patent Application No. 24193683.0 dated Nov. 12, 2024.

(Continued)

*Primary Examiner* — Justin D Seabe
(74) *Attorney, Agent, or Firm* — Getz Balich LLC

(57) ABSTRACT

An assembly is provided for an aircraft propulsion system. This assembly includes a nacelle inlet structure extending axially along and circumferentially about an axis. The nacelle inlet structure includes an inlet lip, an inner barrel, an outer barrel and a plurality of supports. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. The supports are arranged circumferentially about the axis in an array. Each of the supports extends longitudinally along the axis. Each of the supports extends radially between and is connected to the inner barrel and the outer barrel.

20 Claims, 9 Drawing Sheets

(56) References Cited

U.S. PATENT DOCUMENTS

| | | | |
|---|---|---|---|
| 9,874,228 B2* | 1/2018 | Brown | F02C 7/04 |
| 10,160,552 B2 | 12/2018 | Crawford | |
| 11,008,109 B2 | 5/2021 | Khuong | |
| 11,414,203 B2 | 8/2022 | Sanz Martinez | |
| 11,485,500 B2* | 11/2022 | Poloni | B64C 9/22 |
| 2005/0006529 A1 | 1/2005 | Moe | |
| 2006/0145001 A1 | 7/2006 | Smith | |
| 2006/0237582 A1 | 10/2006 | Layland | |
| 2009/0134272 A1 | 5/2009 | Vauchel | |
| 2012/0126062 A1 | 5/2012 | Stewart, III | |
| 2016/0377090 A1 | 12/2016 | Brown | |
| 2019/0291878 A1 | 9/2019 | Kestler | |
| 2020/0017191 A1 | 1/2020 | Porte | |
| 2020/0290747 A1 | 9/2020 | Delsol | |
| 2022/0041295 A1* | 2/2022 | Ferrier | F02C 7/047 |
| 2024/0017845 A1* | 1/2024 | Rust | B64D 33/02 |
| 2024/0367802 A1 | 11/2024 | Sherman | |

OTHER PUBLICATIONS

EP Search Report for EP Patent Application No. 24193548.5 dated Nov. 18, 2024.
EP Search Report for EP Patent Application No. 24193602.0 dated Nov. 27, 2024.
EP Search Report for EP Patent Application 24193695.4 dated Feb. 5, 2025.

* cited by examiner

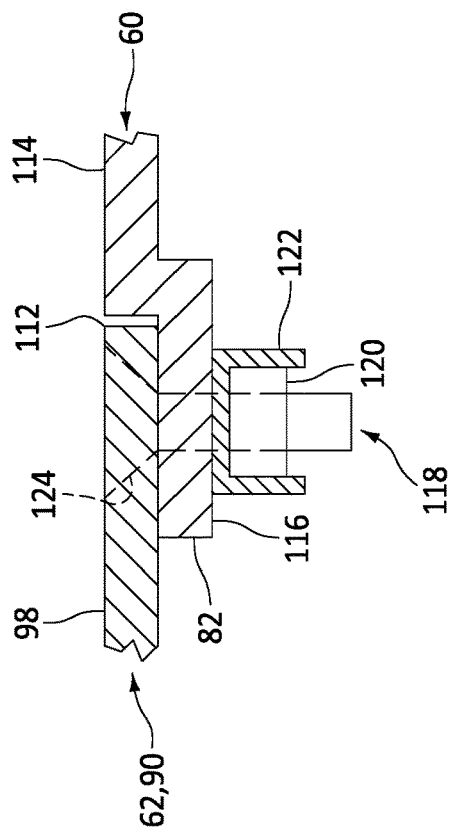
FIG. 4
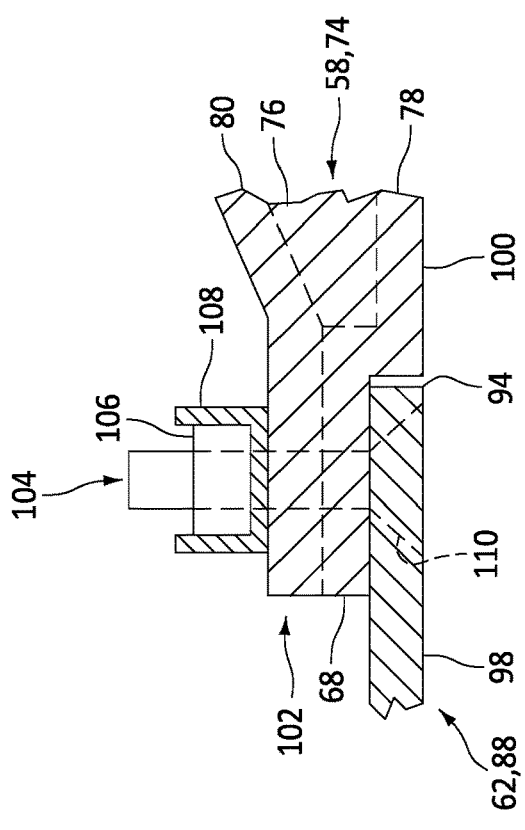
FIG. 5
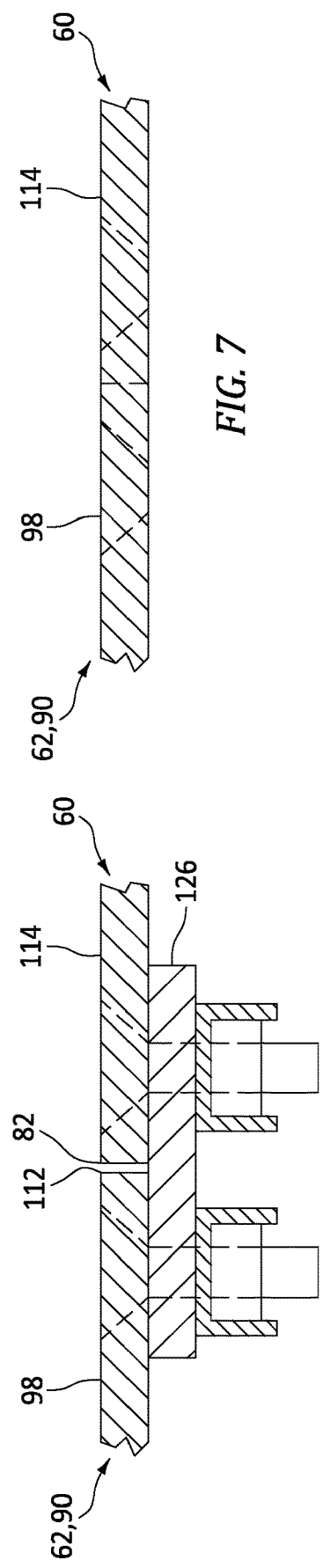
FIG. 6
FIG. 7

OUTER BARREL SUPPORT STRUCTURE FOR NACELLE INLET STRUCTURE

BACKGROUND

1. Technical Field

This disclosure relates generally to an aircraft propulsion system and, more particularly, to a nacelle inlet structure with, for example, an electric anti-icing system.

2. Background Information

A nacelle for an aircraft propulsion system may include an electric anti-icing system for reducing/preventing ice accumulation on an inlet lip of the nacelle. Various types and configurations of anti-icing systems as well as inlet lips are known in the art. While these known anti-icing systems and inlet lips have various benefit, there is still room in the art for improvement.

SUMMARY OF THE DISCLOSURE

According to an aspect of the present disclosure, an assembly is provided for an aircraft propulsion system. This assembly includes a nacelle inlet structure extending axially along and circumferentially about an axis. The nacelle inlet structure includes an inlet lip, an inner barrel, an outer barrel and a plurality of supports. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. The supports are arranged circumferentially about the axis in an array. Each of the supports extends longitudinally along the axis. Each of the supports extends radially between and is connected to the inner barrel and the outer barrel.

According to another aspect of the present disclosure, another assembly is provided for an aircraft propulsion system. This assembly includes a nacelle inlet structure extending axially along and circumferentially about an axis. The nacelle inlet structure includes an inlet lip, an inner barrel, an outer barrel, a bulkhead, a cavity and a support structure. The inlet lip forms a leading edge of the nacelle inlet structure. The inner barrel is connected to the inlet lip at an inner connection. The outer barrel is connected to the inlet lip at an outer connection. The outer barrel is radially outboard of and axially overlaps the inner barrel. The bulkhead is radially between and connected to the inner barrel and the outer barrel. The cavity extends radially within the nacelle inlet structure from the inner barrel to the outer barrel. The cavity extends axially within the nacelle inlet structure from the bulkhead to the inlet lip. The support structure is disposed within the cavity and supports the outer barrel at or about the outer connection. The support structure is formed by a plurality of discrete axially extending supports arranged and spaced apart circumferentially about the axis in an array.

According to still another aspect of the present disclosure, another assembly is provided for an aircraft propulsion system. This assembly includes a nacelle inlet structure extending axially along and circumferentially about an axis. The nacelle inlet structure includes an inlet lip, an inner barrel, an outer barrel, a cavity, a support structure and an electric heater configured with an exterior skin of the inlet lip. The inlet lip forms a leading edge of the nacelle inlet structure. The inner barrel is connected to and projects axially aft away from the inlet lip. The outer barrel is connected to and projects axially aft away from the inlet lip. The outer barrel is radially outboard of and axially overlaps the inner barrel. The cavity extends radially within the nacelle inlet structure from the inner barrel to the outer barrel. The cavity extends axially within the nacelle inlet structure to a portion of the inlet lip forming the leading edge. The support structure is disposed within the cavity and supports the outer barrel. The support structure is formed by a plurality of discrete axially extending supports arranged and spaced apart circumferentially about the axis in an array.

At least one support of the supports may be configured as or otherwise include a gusset.

At least one support of the supports may be configured as or otherwise include a channeled beam.

At least one support of the supports may include a base and a port. The port may project laterally through the base.

At least one support of the supports may include an inner flange, an outer flange and a base extending radially between and integral with the inner flange and the outer flange. The inner flange may be connected to the inner barrel. The outer flange may be connected to the outer barrel.

The inner flange may be bonded to the inner barrel.

The outer flange may be mechanically fastened to the outer barrel.

The supports may include a first support and a second support circumferentially neighboring the first support within the array. The first support may radially taper as the first support extends longitudinally along the axis towards the leading edge. The second support may radially taper as the second support extends longitudinally along the axis away from the leading edge.

The supports may include a first support and a second support. The first support may radially taper as the first support extends longitudinally along the axis towards the leading edge. The second support may radially taper as the second support extends longitudinally along the axis towards the leading edge.

The supports may also include a third support circumferentially between the first support and the second support within the array. The third support may radially taper as the third support extends longitudinally along the axis away from the leading edge.

The supports may include a first support and a second support. The first support may radially taper as the first support extends longitudinally along the axis away from the leading edge. The second support may radially taper as the second support extends longitudinally along the axis away from the leading edge.

The supports may also include a third support circumferentially between the first support and the second support within the array. The first support may radially taper as the third support extends longitudinally along the axis towards the leading edge.

The nacelle inlet structure may also include a bulkhead radially between and connected to the inner barrel and the outer barrel. The supports may be arranged axially between the inlet lip and the bulkhead. Each of the supports may be axially next to and connected to the bulkhead.

At least one support of the supports may be mechanically fastened to the outer barrel axially next to the bulkhead.

At least one support of the supports may be mechanically fastened to the outer barrel axially next to an interface between the outer barrel and the inlet lip.

Each of the supports may be bonded to the inner barrel.

Each of the supports may be configured from or otherwise include thermoplastic material.

The nacelle inlet structure may also include a plurality of structure segments. Each of the structure segments may include an exterior skin and an electric heater. The exterior skin may form a respective circumferential section of the inlet lip.

The structure segments may be arranged circumferentially side-by-side around the axis in an array to collectively form the inlet lip.

The exterior skin may be configured from or otherwise include metal.

The exterior skin may be configured from or otherwise include fiber-reinforced composite material.

The electric heater may be connected to the exterior skin along an interior surface of the exterior skin.

The electric heater may be integrated with the exterior skin.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 4 is a partial sectional illustration of a connection between an inner barrel and an inlet lip.

FIGS. 5-7 are partial sectional illustrations of various connections between an outer barrel and the inlet lip.

DETAILED DESCRIPTION

Figure 1:
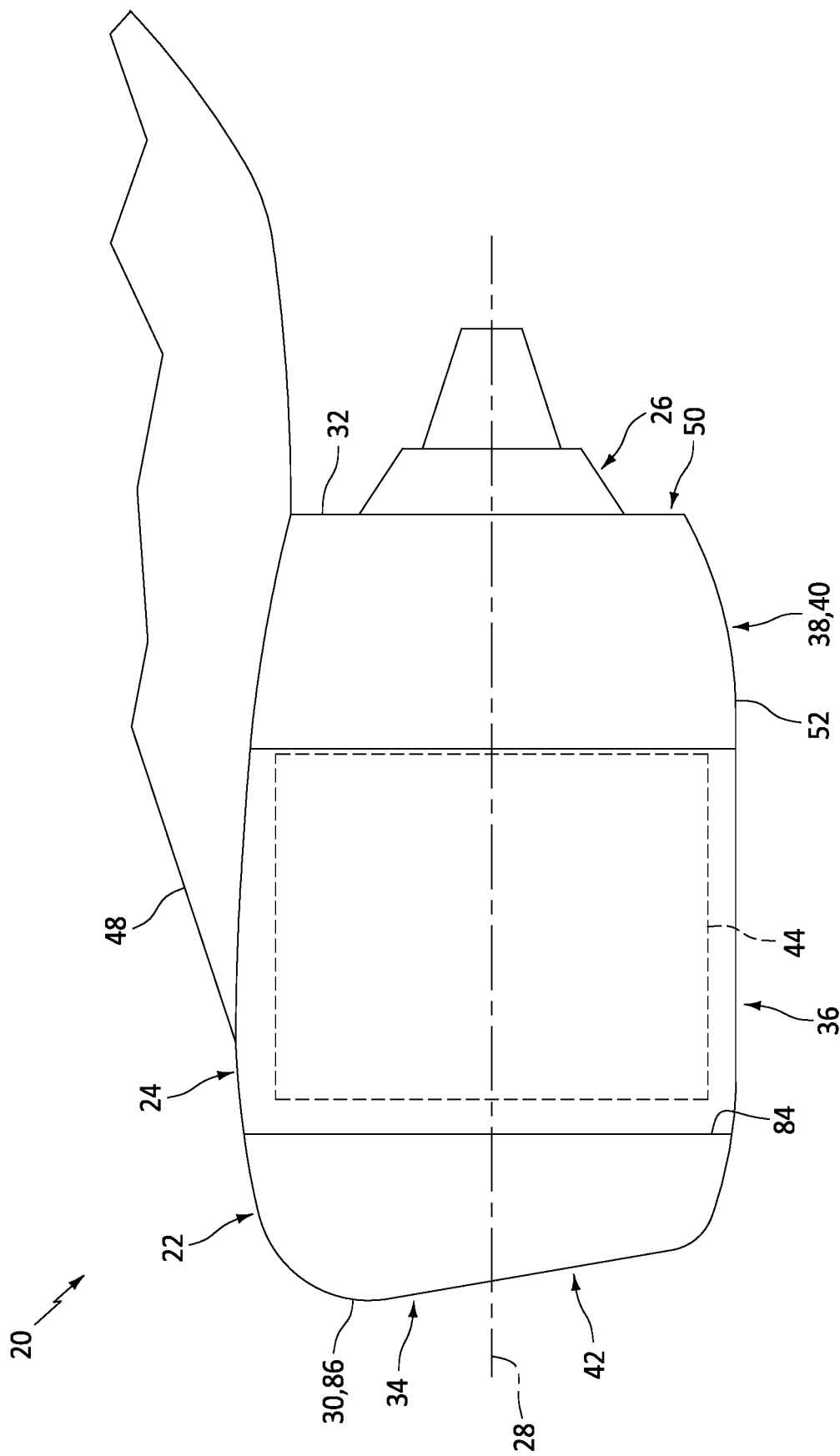
FIG. 1 is a side illustration of an aircraft propulsion system with a pylon.

FIG. 1 illustrates an aircraft propulsion system 20 for an aircraft such as, but not limited to, a commercial airliner or a cargo plane. The aircraft propulsion system 20 includes a nacelle 22 and a gas turbine engine. This gas turbine engine may be configured as a high-bypass turbofan engine. Alternatively, the gas turbine engine may be configured as a turbojet engine or any other type of gas turbine engine capable of propelling the aircraft during flight.

The nacelle 22 is configured to house and provide an aerodynamic cover for the gas turbine engine. The nacelle 22 of FIG. 1, for example, includes a nacelle outer structure 24 and a nacelle inner structure 26; e.g., an inner fixed structure (IFS).

The outer structure 24 extends axially along an axial centerline 28 between an upstream, forward end 30 of the nacelle 22 and its outer structure 24 and a downstream, aft end 32 of the outer structure 24. Briefly, the axial centerline 28 may be a centerline axis of the nacelle 22 and/or the gas turbine engine, and/or a rotational axis for one or more rotating components (e.g., spools) of the gas turbine engine. The outer structure 24 of FIG. 1 includes a nacelle inlet structure 34, one or more nacelle fan cowls 36 (one cowl visible in FIG. 1) and a nacelle aft structure 38, which nacelle aft structure 38 may be configured as part of or include a thrust reverser system 40. The aircraft propulsion system 20, however, may be configured without the thrust reverser system 40 in other embodiments.

The inlet structure 34 is disposed at the nacelle forward end 30. The inlet structure 34 is configured to direct a stream of air through an inlet opening 42 (see also FIG. 2) at the nacelle forward end 30 into the aircraft propulsion system 20 and towards a fan section of the gas turbine engine.

The fan cowls 36 are disposed axially between the inlet structure 34 and the aft structure 38. Each fan cowl 36 of FIG. 1, in particular, is disposed at an aft end of a stationary portion of the nacelle 22, and each fan cowl 36 extends forward to the inlet structure 34. Each fan cowl 36 is generally axially aligned with the fan section of the gas turbine engine. The fan cowls 36 are configured to provide an aerodynamic covering for a fan case 44, which fan case 44 circumscribes a fan rotor within the fan section and may partially form an outer peripheral boundary of a flowpath 46 (see FIG. 2) of the aircraft propulsion system 20.

The term "stationary portion" is used above to describe a portion of the nacelle 22 that is stationary during propulsion system operation (e.g., during aircraft takeoff, aircraft flight and aircraft landing). However, the stationary portion may be otherwise movable for inspection/maintenance of the aircraft propulsion system 20; e.g., when the aircraft propulsion system 20 is non-operational. Each of the fan cowls 36, for example, may be configured to provide access to components of the gas turbine engine such as the fan case 44 and/or peripheral equipment arranged with the fan case 44 for inspection, maintenance and/or otherwise. In particular, each of the fan cowls 36 may be pivotally mounted with the aircraft propulsion system 20 (e.g., to a pylon structure 48) by, for example, a pivoting hinge system. The present disclosure, however, is not limited to the foregoing fan cowl configurations and/or access schemes.

The aft structure 38 of FIG. 1 is disposed at the structure aft end 32. The aft structure 38 is configured to form a bypass exhaust 50 for a bypass flowpath with the inner structure 26. The aft structure 38 may include one or more translating sleeves 52 (one sleeve visible in FIG. 1) for the thrust reverser system 40. The present disclosure, however, is not limited to such a translating sleeve thrust reverser system.

Figure 2:
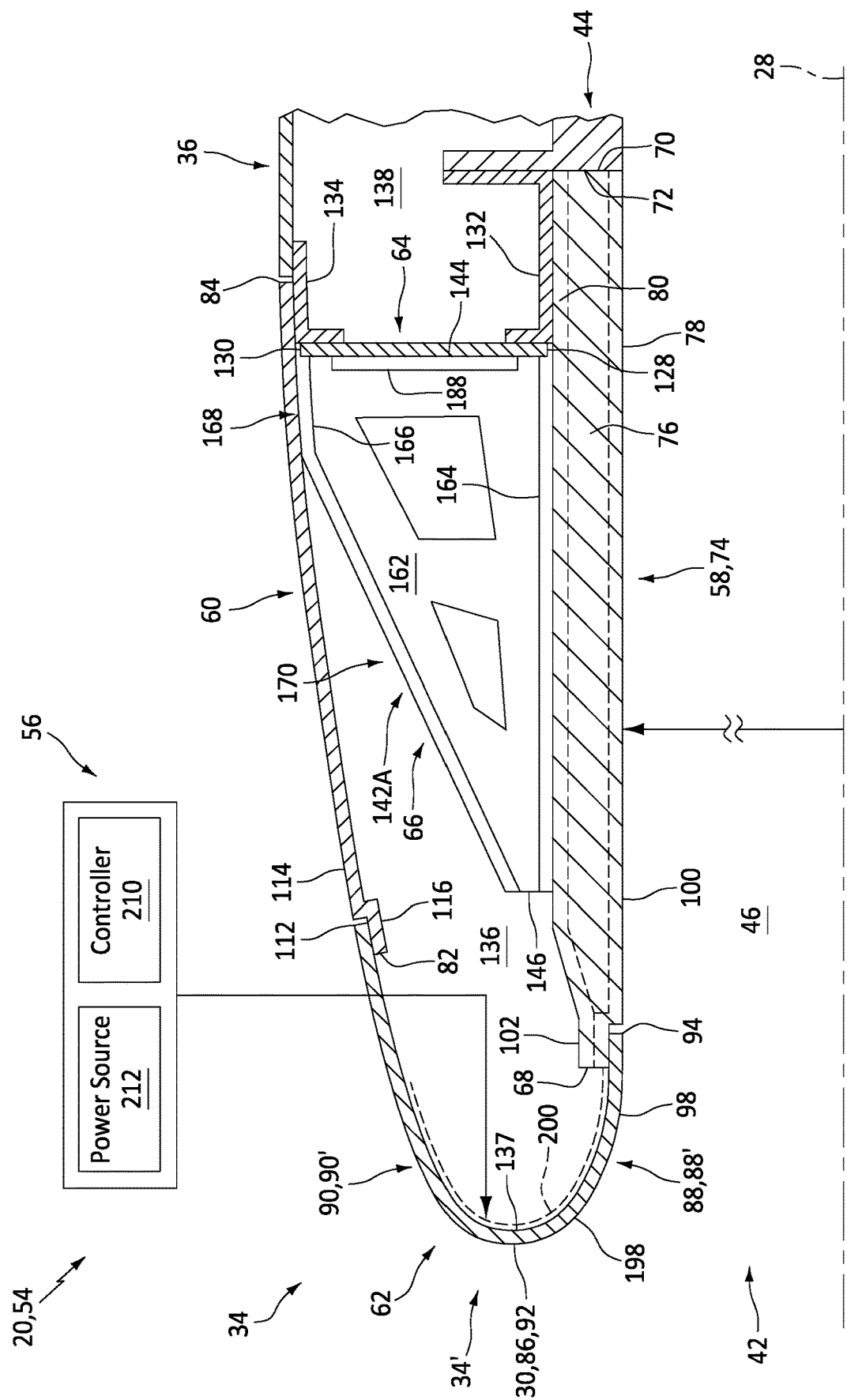
FIGS. 2 and 3 are partial sectional illustrations of the propulsion system at a nacelle inlet structure with an electric anti-icing system at various circumferential positions.
Figure 3:
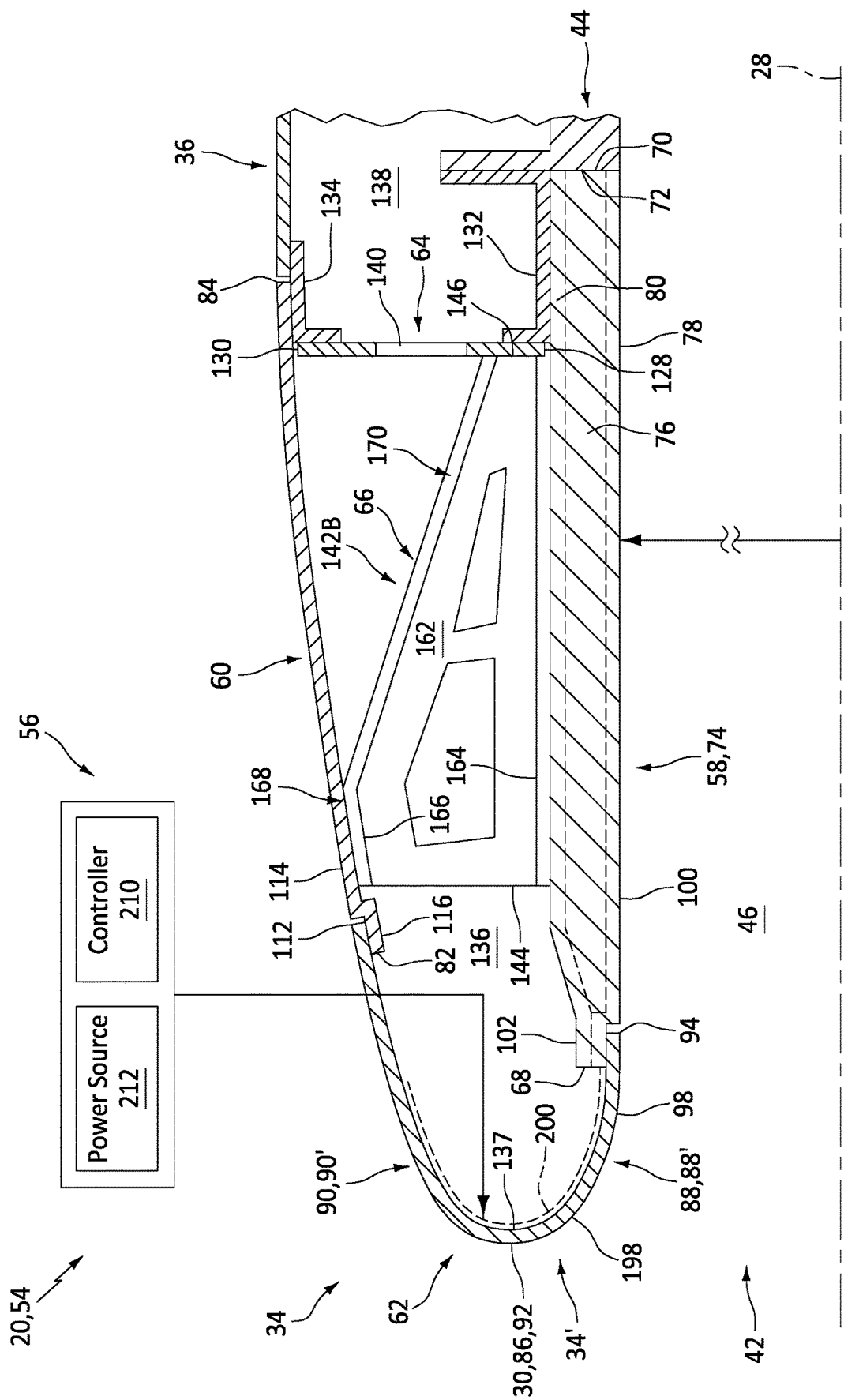

FIGS. 2 and 3 illustrates an assembly 54 for the aircraft propulsion system 20. This propulsion system assembly 54 includes the inlet structure 34, the fan cowls 36 (one cowl visible in FIGS. 2 and 3) and the fan case 44. The propulsion system assembly 54 also includes an electric anti-icing system 56.

The inlet structure 34 of FIGS. 2 and 3 includes an inner barrel 58, an outer barrel 60, an inlet lip 62 (e.g., a nose lip), an aft bulkhead 64 and an internal support structure 66; e.g., a support truss. The inlet structure 34 of FIGS. 2 and 3 also includes one or more components of the anti-icing system 56.

The inner barrel 58 extends axially along the axial centerline 28 from an upstream, forward end 68 of the inner barrel 58 to a downstream, aft end 70 of the inner barrel 58.

The inner barrel 58 extends circumferentially about (e.g., completely around) the axial centerline 28. The inner barrel 58 may thereby have a full-hoop (e.g., tubular) geometry. At (e.g., on, adjacent or proximate) the inner barrel aft end 70, the inner barrel 58 of FIGS. 2 and 3 is mechanically fastened and/or otherwise attached to the fan case 44 at an upstream, forward end 72 of the fan case 44.

The inner barrel 58 may be configured to attenuate sound (e.g., noise) generated during operation of the aircraft propulsion system 20 and, more particularly for example, sound generated by rotation of the fan rotor within the fan section. The inner barrel 58 of FIGS. 2 and 3, for example, includes at least one tubular acoustic panel 74 or an array of arcuate acoustic panels 74 arranged circumferentially about the axial centerline 28. Each acoustic panel 74 may include a cellular (e.g., honeycomb) core 76 bonded to and radially between a perforated face sheet 78 and a non-perforated back sheet 80, where the face sheet 78 faces radially inward and forms an outer peripheral boundary for an axial portion of the flowpath 46. Of course, various other acoustic panel types and configurations are known in the art, and the present disclosure is not limited to any particular ones thereof.

The outer barrel 60 extends axially along the axial centerline 28 from an upstream, forward end 82 of the outer barrel 60 to a downstream, aft end 84 of the outer barrel 60. The outer barrel 60 extends circumferentially about (e.g., completely around) the axial centerline 28. The outer barrel 60 may thereby have a full-hoop (e.g., tubular) geometry. The outer barrel 60 is spaced radially outboard of and axially overlaps the inner barrel 58. The outer barrel 60 thereby circumscribes the inner barrel 58. The outer barrel 60 of FIGS. 2 and 3 is also radially outboard of and axially overlaps at least a portion or an entirety of the aft bulkhead 64 and/or the support structure 66. The outer barrel 60 may thereby circumscribe each inlet structure member 64 and/or 66. At or near the outer barrel forward end 82, the outer barrel 60 may be (e.g., removably) mechanically attached to and supported by the support structure 66 as described below in further detail. At or near the outer barrel aft end 84, the outer barrel 60 may be (e.g., removably) mechanically attached to and supported by the aft bulkhead 64 and/or the support structure 66 as described below in further detail.

The inlet lip 62 forms a leading edge 86 of the nacelle 22 as well as the inlet opening 42 into the aircraft propulsion system 20 (see FIG. 1), where the leading edge 86 is located at the nacelle forward end 30. The inlet lip 62 has a cupped (e.g., generally U-shaped or V-shaped or J-shaped) cross-sectional geometry which extends circumferentially around the axial centerline 28. The inlet lip 62 includes an inner lip portion 88 and an outer lip portion 90.

The inner lip portion 88 extends longitudinally (e.g., radially inwards towards and/or axially along the axial centerline 28) from an intersection 92 with the outer lip portion 90 at the leading edge 86 to an inner downstream, aft end 94 ("inner aft end") of the inlet lip 62 and its inner lip portion 88. The inner lip portion 88 extends circumferentially about (e.g., completely around) the axial centerline 28. The inner lip portion 88 may thereby have a full-hoop (e.g., annular and/or tubular) geometry.

Referring to FIG. 4, the inlet lip 62 and its inner lip portion 88 may be (e.g., removably) mechanically attached to and supported by the inner barrel 58 at an inner connection therebetween. For example, at the inlet lip inner aft end 94, the inner lip portion 88 of FIG. 4 is mated with (e.g., inserted into) an inner recess in the inner barrel 58 at the inner barrel forward end 68. With this arrangement, an exterior surface 98 (e.g., an exterior aerodynamic surface) of the inlet lip 62 and its inner lip portion 88 may be (e.g., radially) flush with/aligned with an exterior surface 100 (e.g., an exterior aerodynamic surface) of the inner barrel 58 formed by its face sheet 78. Here, the inner lip portion 88 axially overlaps and may be abutted (e.g., radially) against a mounting flange 102 of the inner barrel 58. This inner barrel mounting flange 102 may be formed by at least (or only) end portions of the face sheet 78 and the back sheet 80 bonded together without the cellular core 76 therebetween. The inner lip portion 88 of FIG. 4 is removably attached to the inner barrel 58 and its mounting flange 102 by one or more fasteners 104 (one visible in FIG. 3); e.g., bolts. Each fastener 104 of FIG. 4 is mated with and projects (e.g., radially) through a respective fastener aperture in the inlet lip 62 and its inner lip portion 88 and a respective fastener aperture in the inner barrel 58 and its mounting flange 102. Each fastener 104 is threaded into a nut 106 of a nut plate 108 attached to an outer side of the inner barrel mounting flange 102. The inner lip portion 88 and the inner barrel mounting flange 102 may thereby be secured (e.g., clamped) radially between the respective nut 106 and a head 110 of the respective fastener 104. The present disclosure, however, is not limited to such an exemplary mechanical connection or interface between the inner lip portion 88 and the inner barrel 58.

Referring to FIGS. 2 and 3, the outer lip portion 90 extends longitudinally (e.g., radially outwards away from and/or axially along the axial centerline 28) from the intersection 92 with the inner lip portion 88 at the leading edge 86 to an outer downstream, aft end 112 ("outer aft end") of the inlet lip 62 and its outer lip portion 90. As the outer lip portion 90 extends longitudinally towards (e.g., to) the inlet lip outer aft end 112, the outer lip portion 90 axially overlaps and diverges radially away from (in a radial outward direction away from the axial centerline 28) the inner lip portion 88. The outer lip portion 90 extends circumferentially about (e.g., completely around) the axial centerline 28. The outer lip portion 90 may thereby have a full-hoop (e.g., tubular) geometry and circumscribe the inner lip portion 88.

Referring to FIG. 5, the inlet lip 62 and its outer lip portion 90 may be (e.g., removably) mechanically attached to and supported by the outer barrel 60 at an outer connection therebetween. For example, at the inlet lip outer aft end 112, the outer lip portion 90 of FIG. 5 is mated with (e.g., inserted into) an outer recess in the outer barrel 60 at the outer barrel forward end 82. With this arrangement, the inlet lip exterior surface 98 may be flush with/aligned with an exterior surface 114 (e.g., an exterior aerodynamic surface) of the outer barrel 60 formed by its face sheet 78. Here, the outer lip portion 90 axially overlaps and may be abutted (e.g., radially) against a mounting flange 116 of the outer barrel 60. This outer barrel mounting flange 116 may be formed by an inward jogged extension of a panel of material forming an exposed portion (e.g., the rest) of the outer barrel 60. The outer lip portion 90 of FIG. 5 is removably attached to the outer barrel 60 and its mounting flange 116 by one or more fasteners 118 (one visible in FIG. 5); e.g., bolts. Each fastener 118 of FIG. 5 is mated with and projects (e.g., radially) through a respective fastener aperture in the inlet lip 62 and its outer lip portion 90 and a respective fastener aperture in the outer barrel 60 and its mounting flange 116. Each fastener 118 is threaded into a nut 120 of a nut plate 122 attached to an inner side of the outer barrel mounting flange 116. The outer lip portion 90 and the outer barrel mounting flange 116 may thereby be secured (e.g., clamped) radially between the respective nut 120 and a head 124 of the respective fastener 118. The present disclosure, however, is not limited to such an exemplary mechanical connection or interface between the outer lip portion 90 and the outer barrel 60. For example, referring to FIG. 6, the inlet lip outer aft end 112 may be (e.g., axially) abutted against or otherwise disposed next to the outer barrel forward end 82. Here, the outer lip portion 90 and the outer barrel 60 are each radially outboard of and (e.g., axially) overlap a backing plate 126. The outer lip portion 90 and the outer barrel 60 may each be mechanically fastened to the backing plate 126, for example, by respective bolted connections. In still another example, referring to FIG. 7, the inlet lip 62 may be formed integral with the outer barrel 60.

Referring to FIGS. 2 and 3, the aft bulkhead 64 extends vertically from an inner end 128 of the aft bulkhead 64 to an outer end 130 of the aft bulkhead 64. The aft bulkhead 64 extends circumferentially about (e.g., completely around) the axial centerline 28. The aft bulkhead 64 may thereby have a full-hoop (e.g., annular) geometry. This aft bulkhead 64 may be arranged perpendicular to the inner barrel 58, or angularly offset from the inner barrel 58 by a (e.g., non-zero) acute angle.

At the aft bulkhead inner end 128, the aft bulkhead 64 is attached to the inner barrel 58 through, for example, an inner mounting structure 132; e.g., a metal channeled attach ring. This inner mounting structure 132 may also facilitate the attachment of the inner barrel 58 to the fan case 44. At the aft bulkhead outer end 130, the aft bulkhead 64 is attached to outer barrel 60 through, for example, an outer mounting structure 134; e.g., an L-shaped attach ring. With this arrangement, the inlet structure 34 includes an internal cavity 136. This cavity 136 extends radially within the inlet structure 34 and its inlet lip 62 from the inner lip portion 88 to the outer lip portion 90. The cavity 136 also extends radially within the inlet structure 34 from the inner barrel 58 and its back sheet 80 to the outer barrel 60. The cavity 136 extends axially within the inlet structure 34 (and into the inlet lip 62) from a forward side surface of the aft bulkhead 64 to an interior surface 137 of the inlet lip 62 and its members 88 and 90; e.g., all the way to the intersection 92/a portion of the inlet lip 62 forming the leading edge 86. The cavity 136 extends circumferentially about (e.g., completely around) the axial centerline 28. The cavity 136 may thereby have a full-hoop (e.g., annular) geometry within the inlet structure 34.

The cavity 136 may (or may not) be fluidly coupled with an internal compartment 138 between the fan case 44 and each fan cowl 36. For example, referring to FIG. 3, the aft bulkhead 64 may include one or more ports 140 (e.g., access windows, etc.) which extend axially through the aft bulkhead 64 form the internal compartment 138 to the cavity 136.

The support structure 66 is disposed within the cavity 136 axially next to (e.g., abutted against) and forward of the aft bulkhead 64. This support structure 66 is configured to support the outer barrel 60. The support structure 66 of FIGS. 2, 3 and 8, for example, includes one or more forward tapering supports 142A ("forward supports") and/or one or more aft tapering supports 142B ("aft supports"); however, it is contemplated one or more of the supports 142A, 142B may alternatively have a rectangular geometry, a V-shaped geometry, or otherwise.

Figure 8:
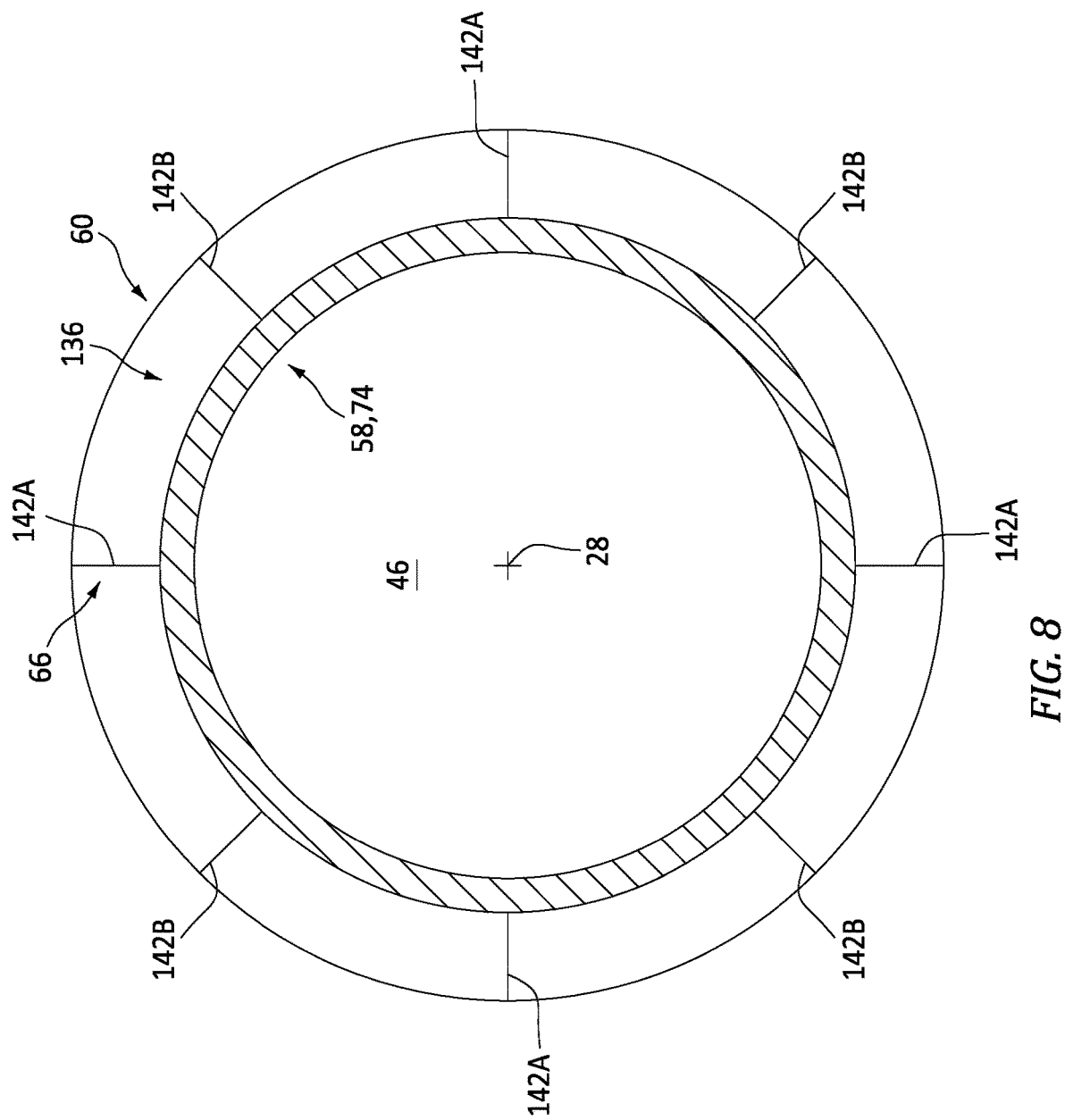
FIG. 8 is a schematic cross-sectional illustration of the nacelle inlet structure.

Referring to FIG. 8, the supports 142A and 142B (generally referred to as "142") are arranged and may be equispaced circumferentially about the axial centerline 28 in an array; e.g., an annular array. More particularly, the forward supports 142A of FIG. 8 are arranged circumferentially about the axial centerline 28 in a forward support array. The aft supports 142B of FIG. 8 are arranged circumferentially about the axial centerline 28 in an aft support array. Here, the forward supports 142A are circumferentially interspersed with the aft supports 142B, and the aft supports 142B are circumferentially interspersed with the forward supports 142A. Each forward support 142A of FIG. 8, for example, is disposed circumferentially between and circumferentially neighbors a respective circumferentially neighboring pair of the aft supports 142B. Each forward support 142A of FIG. 8 is also circumferentially spaced from (and may be circumferentially discrete from, not circumferentially interconnected to, etc.) the respective circumferentially neighboring pair of the aft supports 142B. Similarly, each aft support 142B of FIG. 8 is disposed circumferentially between and circumferentially neighbors a respective circumferentially neighboring pair of the forward supports 142A. Each aft support 142B of FIG. 8 is also circumferentially spaced from (and may be circumferentially discrete from, not circumferentially interconnected to, etc.) the respective circumferentially neighboring pair of the forward supports 142A. While the supports 142 are described above as being equispaced, the present disclosure is not limited to such an exemplary arrangement. For example, one or more (e.g., top) regions of the support structure 66 may include a higher density of the supports 142 to accommodate, for example, maintenance personnel standing on the inlet structure 34, accommodate hail, etc.

Figure 9:
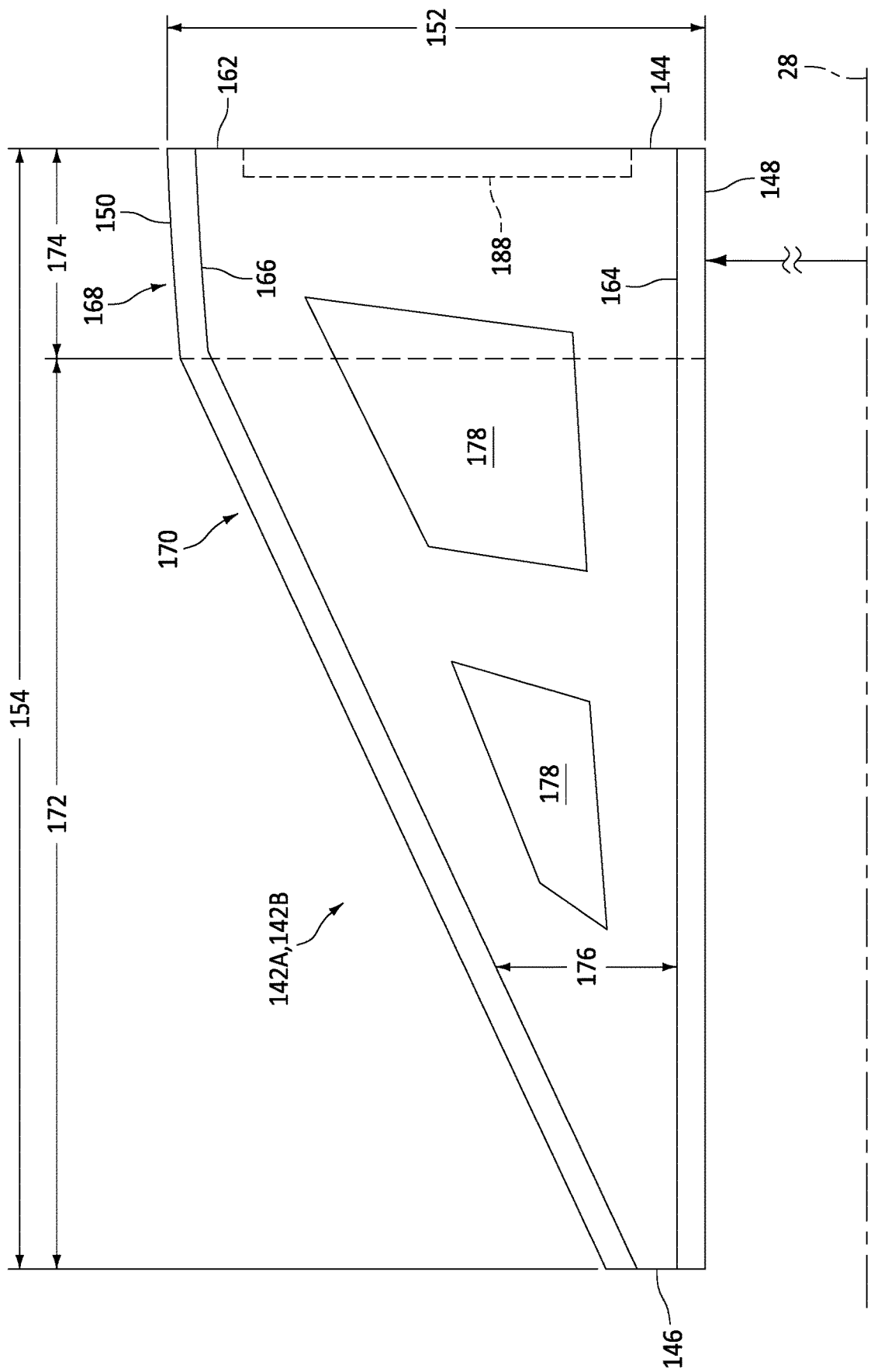
FIG. 9 is a side illustration of a support.
Figure 10:
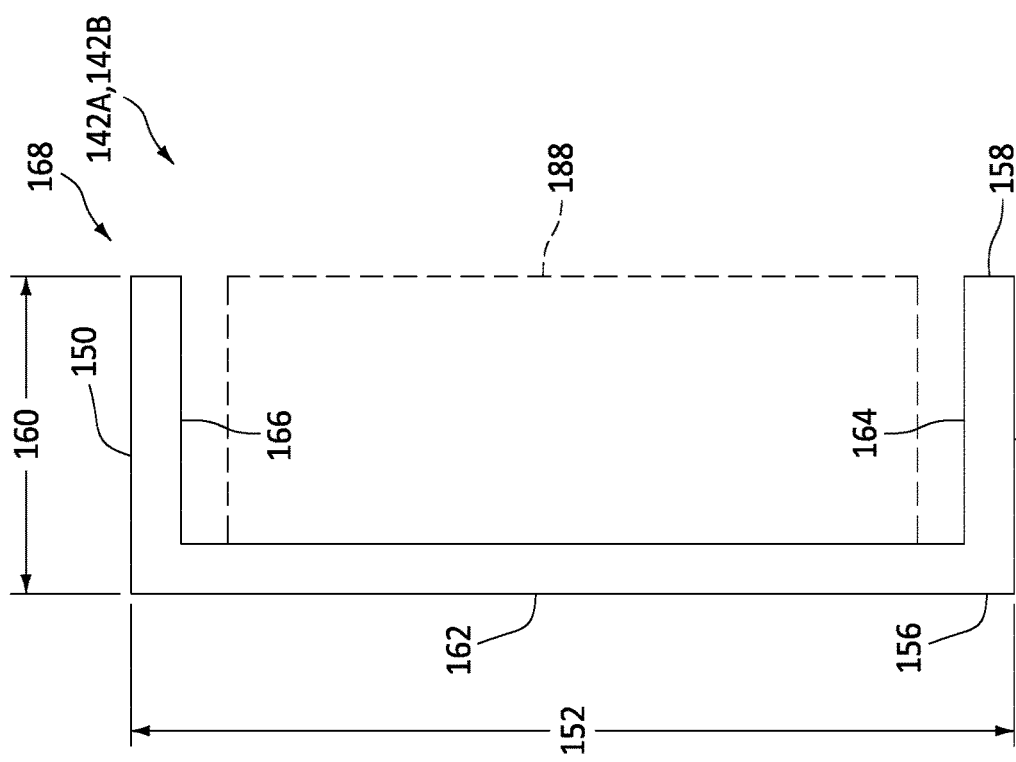
FIG. 10 is an end illustration of the support.

Referring to FIG. 9, each support 142 extends longitudinally (e.g., axially along the centerline axis 28) between and to a first end 144 of the respective support 142 and a second end 146 of the respective support 142. Referring to FIG. 2, the support first end 144 of each forward support 142A may be an aft end of that forward support 142A. The support second end 146 of each forward support 142A may be a forward end of that forward support 142A. By contrast, referring to FIG. 3, the support first end 144 of each aft support 142B may be a forward end of that aft support 142B. The support second end 146 of each aft support 142B may be an aft end of that aft support 142B. Referring again to FIG. 9, each support 142 extends radially between and to an inner end 148 of the respective support 142 and an outer end 150 of the respective support 142. An overall (e.g., maximum) radial height 152 of the support 142 of FIG. 9 between its opposing radial ends 148 and 150 is less than an overall (e.g., maximum) longitudinal length 154 of the support 142 of FIG. 9 between its opposing longitudinal ends 144 and 146. The support length 154, for example, may be two times (2x), three times (3x), four times (4x) or more than the support height 152. Referring to FIG. 10, each support 142 extends laterally (e.g., circumferentially or tangentially) between and to opposing lateral sides 156 and 158 of the respective support 142. An overall (e.g., maximum) lateral width 160 of the support 142 of FIG. 10 between its opposing lateral sides 156 and 158 is less than the support length 154 and the support height 152 of the support 142 of FIG. 9. The support height 152 of FIG. 10, for example, may be times (2x), three times (3x), four times (4x) or more than the support width 160 of FIG. 10. The present disclosure, however, is not limited to the foregoing exemplary dimensional relationships.

Referring to FIGS. 9 and 10, each support 142 may be configured as a channeled beam; e.g., a C-channeled beam. The support 142 of FIGS. 9 and 10, for example, includes a support base 162 (e.g., a web, a plate, etc.) and one or more support flanges 164 and 166. The support base 162 extends radially between and to the support inner flange 164 and the support outer flange 166. The support base 162 of FIG. 10 is disposed at the support first side 156. The support inner flange 164 is disposed at the support inner end 148. This support inner flange 164 is formed integral with the support base 162, and projects laterally out from the support base 162 to a distal end of the support inner flange 164 at support second side 158. The support inner flange 164 of FIG. 10 is perpendicular to the support base 162; however, the present disclosure is not limited to such an exemplary arrangement. The support outer flange 166 is disposed at the support outer end 150. This support outer flange 166 is formed integral with the support base 162, and projects laterally out from the support base 162 to a distal end of the support outer flange 166 at support second side 158. The support outer flange 166 of FIG. 10 is perpendicular to the support base 162. The present disclosure, however, is not limited to such an exemplary arrangement. For example, one or more of the supports 142 may each be configured with a Z cross-section, an I cross-section, an L cross-section, a T cross-section, two back-to-back beams with L cross-sections, or the like.

Referring to FIG. 9, at least a portion (or an entirety) of each support 142 may be radially tapered. The support 142 of FIG. 9, for example, includes a base portion 168 and a tapered portion 170 (e.g., a gusset portion) along its longitudinal support length 154. The base portion 168 is configured to mount to the outer barrel 60 as described below in further detail. The base portion 168 also defines the support height 152 of the respective support 142. The base portion 168 is disposed at the support first end 144, and may or may not be tapered. The tapered portion 170 projects longitudinally (e.g., axially along the axial centerline 28) out from the base portion 168 to the support second end 146. Here, a longitudinal length 172 of the tapered portion 170 is longer than a longitudinal length 174 of the base portion 168. The tapered portion length 172, for example, may be times (2x), three times (3x), four times (4x) or more than the base portion length 174. The present disclosure, however, is not limited to the foregoing exemplary dimensional relationships. Referring again to FIG. 9, as the tapered portion 170 projects longitudinally out from the base portion 168, the support 142 of FIG. 9 radially tapers. More particularly, as the tapered portion 170 projects longitudinally out from the base portion 168 towards (or to) the support second end 146, the support flanges 164 and 166 move closer radially together and/or a radial height 176 of the support base 162 decreases.

The support 142 of FIG. 9 may include one or more ports 178. Each of these support ports 178 projects laterally through the respective support 142 and its support base 162. An interior edge of the support base 162 forming a respective support port 178 may be flared so as to provide additional rigidity to the support base 162.

Figure 11:
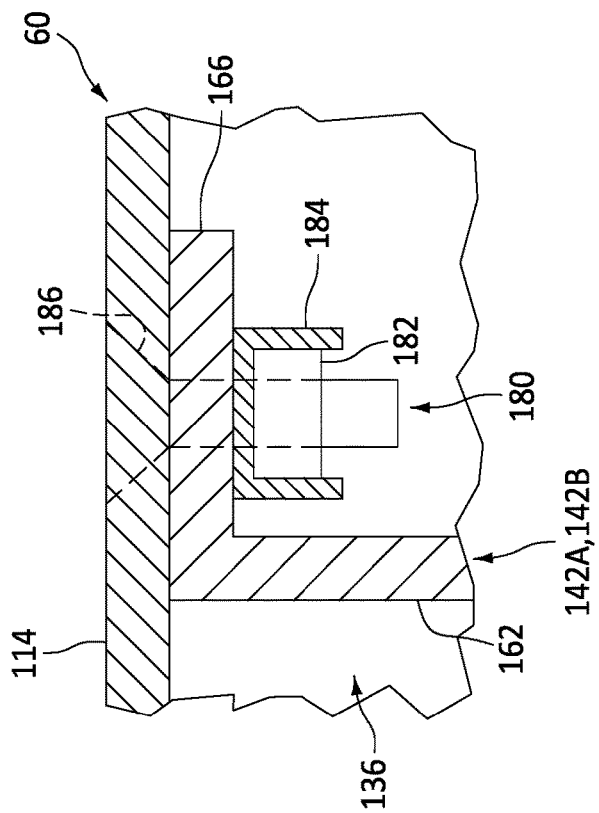
FIG. 11 is a partial sectional illustration of a connection between the support and the outer barrel.

Referring to FIGS. 2 and 3, each support 142 may project axially out from the aft bulkhead 64, within the cavity 136, towards the inlet lip 62 and its leading edge 86. Each support 142 extends radially, within the cavity 136, between and to the inner barrel 58 and the outer barrel 60. For example, the support inner flange 164 along the base portion 168 and the tapered portion 170 may radially engage (e.g., abut radially against) the inner barrel 58 and its back sheet 80. This support inner flange 164 is also connected to the inner barrel 58 and its back sheet 80. The support inner flange 164, for example, may be bonded (e.g., welded) to and/or otherwise attached the inner barrel 58 and its back sheet 80. The support outer flange 166 along the base portion 168 (e.g., not the tapered portion 170) may radially engage (e.g., abut radially against) the outer barrel 60. This support outer flange 166 is also (e.g., removably) mechanically attached to and supports the outer barrel 60. The support outer flange 166 of FIG. 11, for example, is removably attached to the outer barrel 60 by one or more fasteners 180 (one visible in FIG. 11); e.g., bolts. Each fastener 180 of FIG. 11 is mated with and projects (e.g., radially) through a respective fastener aperture in the outer barrel 60 and a respective fastener aperture in the respective support outer flange 166. Each fastener 180 is threaded into a nut 182 of a nut plate 184 attached to an inner side of the respective support outer flange 166. The respective support outer flange 166 and the outer barrel 60 may thereby be secured (e.g., clamped) radially between the respective nut 182 and a head 186 of the respective fastener 180. The present disclosure, however, is not limited to such an exemplary mechanical connection or interface between the support 142 and the outer barrel 60. Referring to FIGS. 2 and 3, the support outer flange 166 along the tapered portion 170 may be radially spaced from the outer barrel 160 along its longitudinal length. Here, a radial distance between the outer barrel 160 and the support outer flange 166 along the tapered portion 170 may increase as the tapered portion 170 projects longitudinally (e.g., axially) away from the base portion 168.

Referring to FIG. 2, the support outer flange 166 along the base portion 168 of each forward support 142A may be disposed at (or about) the connection/interface between the outer barrel 60 and the aft bulkhead 64. The support structure 66 may thereby radially support the outer barrel 60 at the aft bulkhead 64. Here, each forward support 142A also forms or otherwise includes a gusset (e.g., a gusset plate) between the aft bulkhead 64 and the inner barrel 58. Referring to FIG. 3, the support outer flange 166 along the base portion 168 of each aft support 142B may be disposed at (or about) the connection/interface between the outer barrel 60 and the outer lip portion 90. The support structure 66 may thereby radially support the outer barrel 60 and, thus, the outer lip portion 90 at (or about) the connection/interface between the outer barrel 60 and the outer lip portion 90. With this arrangement of the aft supports 142B, the inlet structure 34 may be configured without another bulkhead (e.g., a forward bulkhead) forward of the aft bulkhead 64 along the axial centerline 28. This in turn may provide easier access for installation and/or maintenance personnel within the inlet structure 34.

Figures 12, 13:
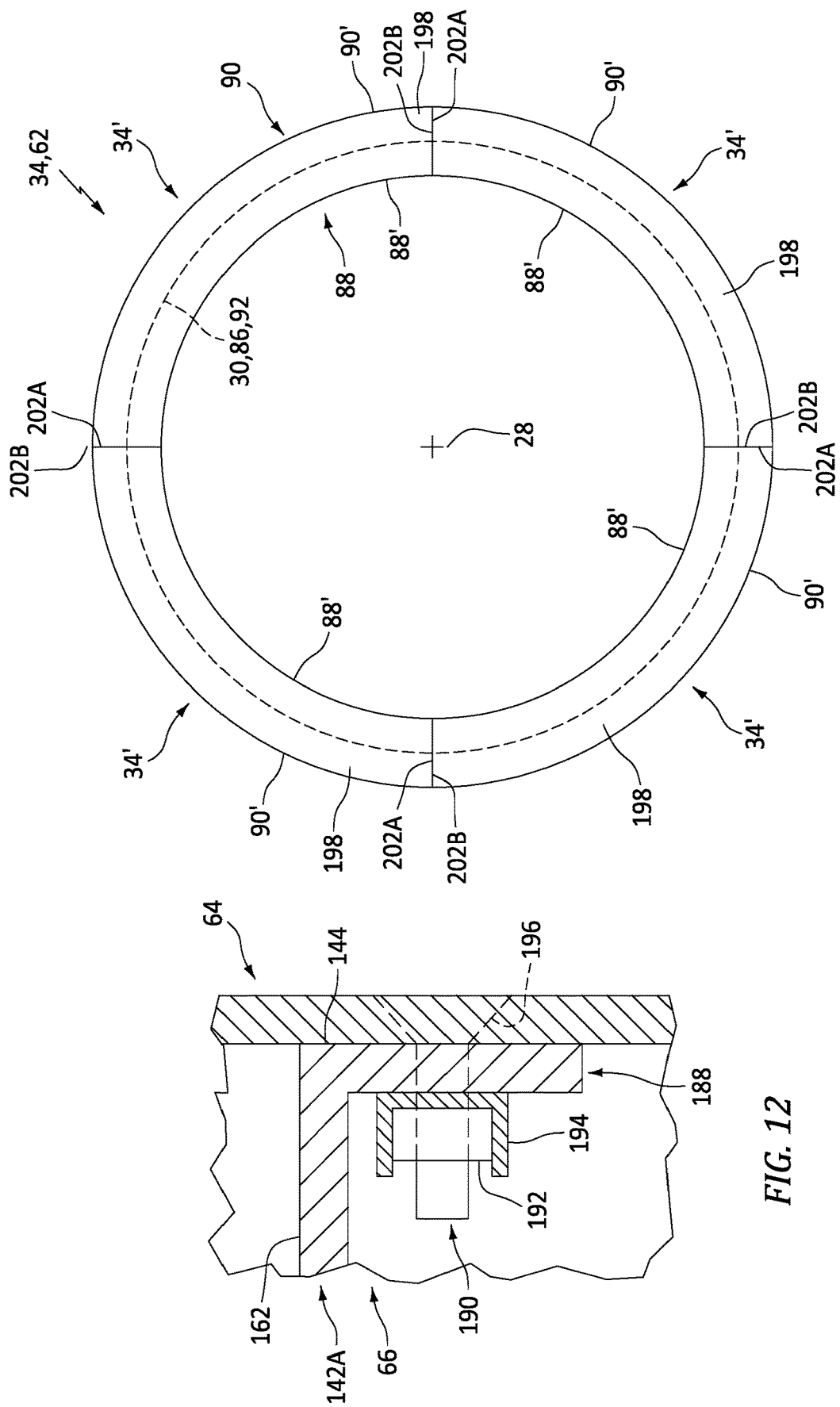
FIG. 12 is a partial sectional illustration of a connection between the support and a bulkhead.
FIG. 13 is an end view illustration of an inlet lip for the nacelle inlet structure.

Referring to FIG. 12, the support structure 66 may also support and/or may be supported by the aft bulkhead 64. Each forward support 142A, for example, may be (e.g., removably) mechanically attached to the aft bulkhead 64. The forward support 142A of FIG. 12, for example, includes an end flange 188 at its support first end 144 (see also dashed lines in FIGS. 9 and 10). This end flange 188 is removably attached to the aft bulkhead 64 by one or more fasteners 190 (one visible in FIG. 12); e.g., bolts. Each fastener 190 of FIG. 12 is mated with and projects (e.g., radially) through a respective fastener aperture in the end flange 188 and a respective fastener aperture in the aft bulkhead 64. Each fastener 190 is threaded into a nut 192 of a nut plate 194 attached to a forward side of the end flange 188. The end flange 188 and the aft bulkhead 64 may thereby be secured (e.g., clamped) radially between the respective nut 192 and a head 196 of the respective fastener 190. The present disclosure, however, is not limited to such an exemplary mechanical connection or interface between each forward support 142A and the aft bulkhead 64. For example, each forward support 142A may also or alternatively be fastened (e.g., via one or more permanent fasteners) and/or bonded (e.g., welded) to the aft bulkhead 64.

Referring to FIG. 13, the inlet structure 34 includes a plurality of discrete circumferential inlet structure segments 34'. These structure segments 34' are arranged circumferentially side-by-side around the axial centerline 28 in an array to collectively form at least one member of the inlet structure 34; e.g., the inlet lip 62 and its inner lip portion 88 and its outer lip portion 90. Note, while the inlet structure 34 is shown with four (4) of the structure segments 34' in FIG. 13, the inlet structure 34 may alternatively include less than or more than four (4) of the structure segments 34' in other embodiments; e.g., two (2) or three (3) of the structure segments 34', five (5) or six (6) of the structure segments 34', etc. Referring to FIGS. 2 and 3, one or more or all of the structure segments 34' each include a segment exterior skin 198 and an electric heater 200.

The exterior skin 198 may be configured as a relatively thin sheet or layer of continuous and uninterrupted material; e.g., non-perforated material. The exterior skin 198 may form a (e.g., entire) circumferential section of the inlet lip 62 and its inner lip portion 88 and its outer lip portion 90. Each exterior skin 198 of FIG. 13, for example, extends circumferentially about the axial centerline 28 between and to opposing circumferential sides 202A and 202B (generally referred to as "202") of the respective structure segment 34'. The exterior skin 198 of FIGS. 2 and 3 extends longitudinally from a longitudinal inner end of the exterior skin 198 to a longitudinal outer end of the exterior skin 198. The skin inner end may be located at the inlet lip inner aft end 94. The skin outer end may be located at and/or form a circumferential section of the inlet lip outer aft end 112. Here, the skin inner end is disposed axially aft of the skin outer end along the axial centerline 28. With this arrangement, the exterior skin 198 includes an inner lip section 88' and an outer lip section 90'. The inner lip section 88' forms a (e.g., entire) respective circumferential section 88' of the inner lip portion 88 of the inlet lip 62. The outer lip section 90' forms a (e.g., entire) respective circumferential section 90' of the outer lip portion 90 of the inlet lip 62.

Figure 14:
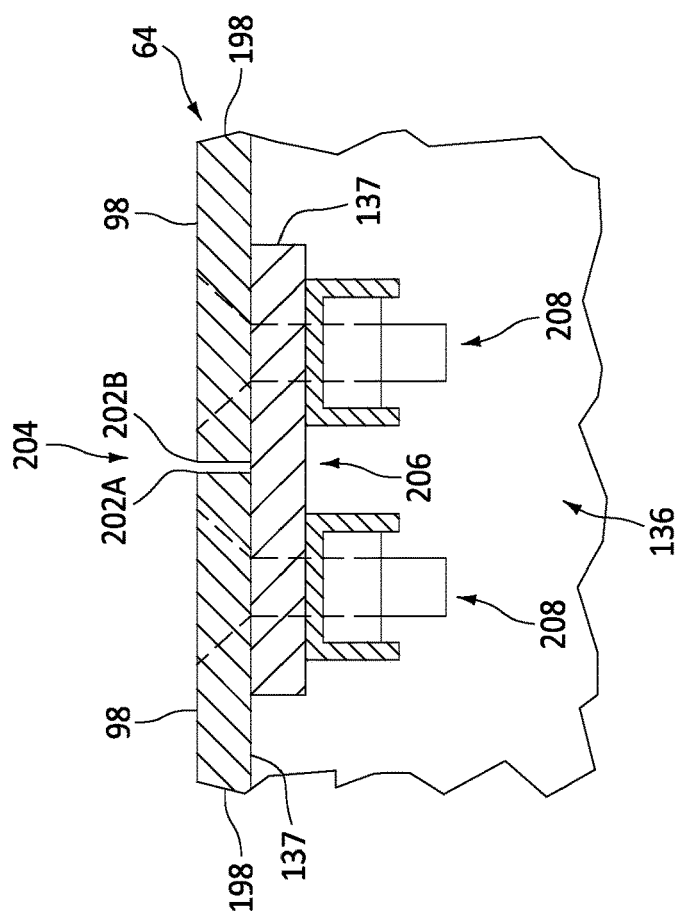
FIG. 14 is a partial cross-sectional illustration of the nacelle inlet structure at an interface between neighboring circumferential segments.

Referring to FIG. 14, at each segment side 202, each exterior skin 198 is disposed circumferentially next to a circumferentially neighboring (e.g., adjacent) exterior skin 198 at an inter-skin interface 204; e.g., a seam. At this inter-skin interface 204, the respective exterior skins 198 may be circumferentially engaged with (e.g., contact one another, abut against one another) or may be slightly circumferentially spaced from one another. Also at the inter-skin interface 204, the respective exterior skins 198 may be attached to one another through an axially extending inter-skin coupler 206. More particularly, each exterior skin 198 may be (e.g., removably) mechanically attached to the respective inter-skin coupler 206 by, for example, one or more fasteners 208; e.g., bolts, rivets, etc. Each fastener 208, for example, may project (e.g., radially) through the respective exterior skin 198 and the inter-skin coupler 206. The present disclosure, however, is not limited to such an exemplary mechanical connection or interface between circumferentially neighboring exterior skins 198.

Figure 15A:
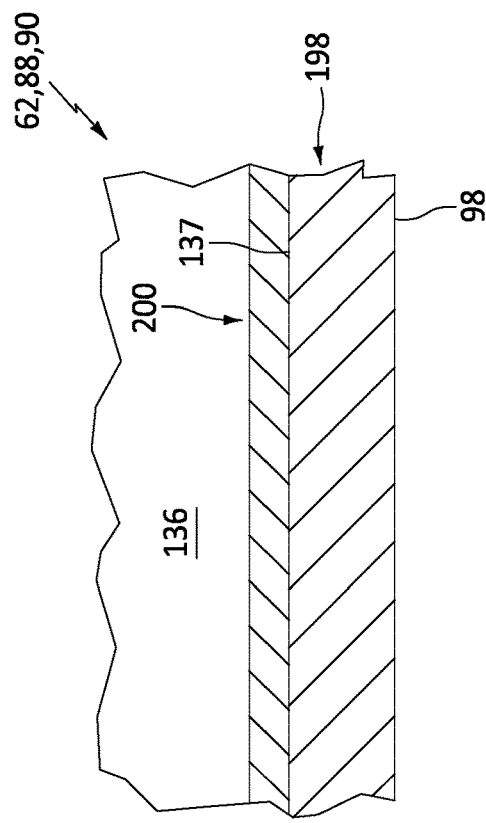
FIGS. 15A and 15B are partial schematic sectional illustrations of various skin-electric heater arrangements.
Figure 15B:
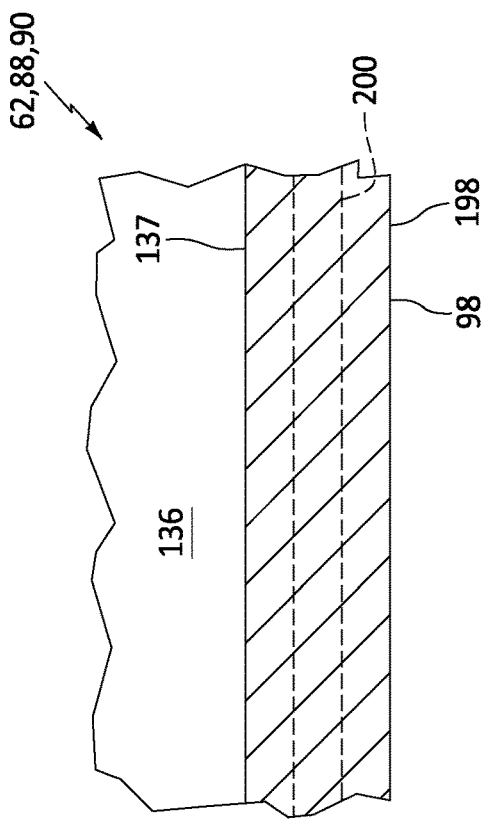

Referring to FIGS. 2 and 3, the electric heater 200 is arranged with the exterior skin 198. The electric heater 200 of FIGS. 2 and 3, for example, may extend longitudinally along at least a portion or an entirety of the inner lip section 88' and/or at least a portion or an entirety of the outer lip section 90'. Each electric heater 200 may extend circumferentially about the axial centerline 28 between and to (or about) the opposing segment sides 202 (see FIG. 13). In some embodiments, referring to FIG. 15A, the electric heater 200 may be disposed within/along the cavity 136. The electric heater 200, for example, may be bonded to or otherwise attached to inlet lip interior surface 137. In other embodiments, referring to FIG. 15B, the electric heater 200 may be integrated into the exterior skin 198. The electric heater 200, for example, may be embedded or otherwise incorporated into the exterior skin material and, thus, between the inlet lip interior surface 137 and the inlet lip exterior surface 98.

Referring to FIG. 2, the anti-icing system 56 includes the electric heater 200 that is part of/integrated with each structure segment 34'. The anti-icing system 56 also includes a controller 210 and an electrical power source 212; e.g., one or more batteries, an electric generator, etc. This anti-icing system 56 is configured to melt and/or prevent ice accumulation on each exterior skin 198 and its exterior surface 98, for example, at, along and near the leading edge 86. The controller 210, for example, may signal the power source 212 (or a switch and/or other regulator between the power source 212 and each electric heater 200) to provide electricity to each electric heater 200. The electricity energizers each electric heater 200 and its heating elements, and each electric heater 200 generates heat energy. The heat energy transfers (e.g., conducts) through the exterior skin material towards (e.g., to) the respective exterior surface 98 (e.g., an exterior aerodynamic surface of the inlet structure 34) thereby heating that exterior surface 98 to an elevated temperature. This elevated temperature may be selected to be warm enough to melt any ice accumulating on the respective exterior surface 98 and/or prevent accumulation of the ice on the respective exterior surface 98, while cool enough so as not to damage the respective exterior skin 198 (e.g., when made from the composite material) or any surrounding components and/or needlessly expend energy.

During propulsion system operation, the inlet structure 34 and one or more of its exterior skins 198 may be damaged (e.g., dented, fractured, etc.) when impacted by a foreign object; e.g., a relatively large bird. The inlet structure arrangement of the present disclosure is configured to facilitate relatively easy and/or fast repairs of the inlet structure 34 following such damage. Each damaged exterior skin 198, for example, may be unfastened and individually removed from the inlet structure 34 without requiring, for example, additional removal of adjacent (e.g., undamaged) exterior skins 198. In addition to facilitating relatively easy and/or fast repairs, costs associated with such repairs may also be reduced since only a portion (e.g., one or two of the exterior skins 198) of the inlet structure 34 may need to be repaired/replaced.

In some embodiments, the inlet structure 34 may be configured as a composite structure. One or more or all of the inlet structure elements 58, 60, 62, 64 and/or 66, for example, may be (e.g., partially or completely) constructed from a composite material; e.g., fiber-reinforced composite material. The exterior skin material, for example, may include a polymer (e.g., thermoplastic or thermoset) matrix and fiber-reinforcement (e.g., carbon fibers, fiberglass fibers, aramid fibers, etc.) embedded within the polymer matrix. It is contemplated, however, one or more of all of the inlet structure elements 58, 60, 62, 64 and/or 66 may alternatively (or also) be constructed from metal.

While various exemplary nut plates are shown in the drawings, the present disclosure is not limited to such exemplary arrangements. Examples of other suitable nut plate connections include, but are not limited to, rivet-less nut plates, Keenserts, bonded inserts, and the like.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nacelle inlet structure extending axially along and circumferentially about an axis, the nacelle inlet structure including an inlet lip, an inner barrel, an outer barrel and a plurality of supports;
   the inlet lip forming a leading edge of the nacelle inlet structure, the inlet lip including an outer aft end;
   the inner barrel projecting axially aft away from the inlet lip;
   the outer barrel projecting axially aft away from the inlet lip, the outer barrel including a mounting flange, the mounting flange connected to the outer aft end forming an interface between the outer barrel and the inlet lip, and the outer barrel radially outboard of and axially overlapping the inner barrel; and
   the plurality of supports arranged circumferentially about the axis in an array and configured to support the outer barrel, each of the plurality of supports extending longitudinally along the axis, each of the plurality of supports extending radially between and connected to the inner barrel and the outer barrel, and forward ends of the plurality of supports disposed aft of the interface between the outer barrel and the inlet lip.

2. The assembly of claim 1, wherein at least one support of the plurality of supports comprises a gusset.

3. The assembly of claim 1, wherein at least one support of the plurality of supports comprises a channeled beam.

4. The assembly of claim 1, wherein
   at least one support of the plurality of supports includes a base and a port; and
   the port project laterally through the base.

5. The assembly of claim 1, wherein
   at least one support of the plurality of supports includes an inner flange, an outer flange and a base extending radially between and integral with the inner flange and the outer flange;
   the inner flange is connected to the inner barrel; and
   the outer flange is connected to the outer barrel.

6. The assembly of claim 5, wherein the inner flange is bonded to the inner barrel.

7. The assembly of claim 5, wherein the outer flange is mechanically fastened to the outer barrel.

8. The assembly of claim 1, wherein
   the plurality of supports include a first support and a second support circumferentially neighboring the first support within the array;
   the first support radially tapers as the first support extends longitudinally along the axis towards the leading edge; and
   the second support radially tapers as the second support extends longitudinally along the axis away from the leading edge.

9. The assembly of claim 1, wherein
   the plurality of supports include a first support and a second support;
   the first support radially tapers as the first support extends longitudinally along the axis towards the leading edge; and
   the second support radially tapers as the second support extends longitudinally along the axis towards the leading edge.

10. The assembly of claim 9, wherein
    the plurality of supports further include a third support circumferentially between the first support and the second support within the array; and
    the third support radially tapers as the third support extends longitudinally along the axis away from the leading edge.

11. The assembly of claim 1, wherein
    the plurality of supports include a first support and a second support;
    the first support radially tapers as the first support extends longitudinally along the axis away from the leading edge; and
    the second support radially tapers as the second support extends longitudinally along the axis away from the leading edge.

12. The assembly of claim 11, wherein
    the plurality of supports further include a third support circumferentially between the first support and the second support within the array; and
    the first support radially tapers as the third support extends longitudinally along the axis towards the leading edge.

13. The assembly of claim 1, wherein
    the nacelle inlet structure further includes a bulkhead radially between and connected to the inner barrel and the outer barrel;
    the plurality of supports are arranged axially between the inlet lip and the bulkhead; and
    each of the plurality of supports is axially next to and connected to the bulkhead.

14. The assembly of claim 13, wherein at least one support of the plurality of supports is mechanically fastened to the outer barrel axially next to the bulkhead.

15. The assembly of claim 1, wherein at least one support of the plurality of supports is mechanically fastened to the outer barrel axially next to the interface between the outer barrel and the inlet lip.

16. The assembly of claim 1, wherein each of the plurality of supports is bonded to the inner barrel.

17. The assembly of claim 1, wherein each of the plurality of supports comprises thermoplastic material.

18. The assembly of claim 1, wherein
    the nacelle inlet structure further includes a plurality of structure segments;
    each of the plurality of structure segments includes an exterior skin and an electric heater; and
    the exterior skin forms a respective circumferential section of the inlet lip.

19. An assembly for an aircraft propulsion system, comprising:
    a nacelle inlet structure extending axially along and circumferentially about an axis, the nacelle inlet structure including an inlet lip, an inner barrel, an outer barrel, a bulkhead, a cavity and a support structure;
    the inlet lip forming a leading edge of the nacelle inlet structure;
    the inner barrel connected to the inlet lip at an inner connection;

the outer barrel connected to the inlet lip at an outer connection, and the outer barrel radially outboard of and axially overlapping the inner barrel;

the bulkhead radially between and connected to the inner barrel and the outer barrel;

the cavity extending radially within the nacelle inlet structure from the inner barrel to the outer barrel, and the cavity extending axially within the nacelle inlet structure from the bulkhead to the inlet lip; and the support structure disposed within the cavity, the support structure supporting the outer barrel, the support structure disposed aft of the outer connection and the inner connection, and the support structure formed by a plurality of discrete axially extending supports arranged and spaced apart circumferentially about the axis in an array.

20. An assembly for an aircraft propulsion system, comprising:

a nacelle inlet structure extending axially along and circumferentially about an axis, the nacelle inlet structure including an inlet lip, an inner barrel, an outer barrel, a cavity, a support structure and an electric heater configured with an exterior skin of the inlet lip;

the inlet lip forming a leading edge of the nacelle inlet structure;

the inner barrel connected to and projecting axially aft away from the inlet lip at a first interface;

the outer barrel connected to and projecting axially aft away from the inlet lip at a second interface, and the outer barrel radially outboard of and axially overlapping the inner barrel;

the cavity extending radially within the nacelle inlet structure from the inner barrel to the outer barrel, and the cavity extending axially within the nacelle inlet structure to a portion of the inlet lip forming the leading edge; and the support structure disposed within the cavity and supporting the outer barrel, the support structure disposed axially downstream of the first interface and axially downstream of the second interface, and the support structure formed by a plurality of discrete axially extending supports arranged and spaced apart circumferentially about the axis in an array.

\* \* \* \* \*